US006251174B1

(12) United States Patent
Lavery et al.

(10) Patent No.: US 6,251,174 B1
(45) Date of Patent: Jun. 26, 2001

(54) INK COMPOSITION CONTAINING AT LEAST TWO AZO DYES

(75) Inventors: Aidan Joseph Lavery, High Wycombe (GB); John Parker Meyers, New Castle, DE (US)

(73) Assignee: Avecia Limited (GB)

( * ) Notice: Subject to any disclaimer, the term of this patent is extended or adjusted under 35 U.S.C. 154(b) by 0 days.

(21) Appl. No.: 09/402,269

(22) PCT Filed: Mar. 26, 1998

(86) PCT No.: PCT/GB98/00930

§ 371 Date: Dec. 23, 1999

§ 102(e) Date: Dec. 23, 1999

(87) PCT Pub. No.: WO98/44053

PCT Pub. Date: Oct. 8, 1998

(30) Foreign Application Priority Data

Apr. 1, 1997 (GB) .................................... 9706580
Aug. 16, 1997 (GB) .................................... 9717392

(51) Int. Cl.[7] .................................................. C09D 11/02
(52) U.S. Cl. .................................. 106/31.52; 106/31.48; 106/31.5; 8/639; 8/641
(58) Field of Search ........................ 106/31.52, 31.5, 106/31.48; 8/639, 641

(56) References Cited

U.S. PATENT DOCUMENTS

| | | | |
|---|---|---|---|
| 4,620,876 | * 11/1986 | Fujii et al. | 106/31.52 |
| 4,765,838 | * 8/1988 | Ohata et al. | 106/31.52 |
| 4,804,387 | * 2/1989 | Degen et al. | 8/641 |
| 5,053,495 | * 10/1991 | Greenwood et al. | 106/31.52 |
| 5,203,912 | * 4/1993 | Greenwood et al. | 106/31.52 |
| 5,254,159 | * 10/1993 | Gundlach et al. | 106/31.52 |
| 5,370,730 | * 12/1994 | Gregory et al. | 106/31.52 |
| 5,439,517 | * 8/1995 | Yoshida et al. | 106/31.52 |
| 5,647,897 | * 7/1997 | Ouki et al. | 106/31.52 |
| 5,795,970 | * 8/1998 | Ono et al. | 8/639 |
| 5,938,827 | * 9/1999 | Breton et al. | 106/31.52 |
| 6,048,390 | * 4/2000 | Yano et al. | 106/31.52 |

FOREIGN PATENT DOCUMENTS

0356080 * 2/1990 (EP) .
0565286 * 10/1993 (EP) .

* cited by examiner

Primary Examiner—Helene Klemanski
(74) Attorney, Agent, or Firm—Rothwell, Figg, Ernst & Manbeck

(57) ABSTRACT

A composition comprising:
(i) a dye of Formula (1) or a salt thereof:

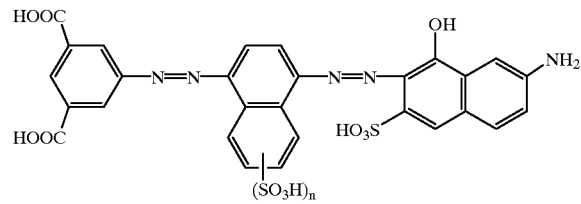

Formula (1)

wherein n is 0 or 1; and
(ii) at least one dye selected from a dye of the Formula (2), (3), (4), (5), (6), (7) and salts thereof as defined in the description. Also claimed are the above compositions further comprising a water-soluble yellow dye and optionally a water-soluble cyan dye; inks containing the compositions; an ink jet printing process using the inks; and a substrate printed with the inks.

20 Claims, 2 Drawing Sheets

INK COMPOSITION CONTAINING AT LEAST TWO AZO DYES

This invention relates to a composition comprising two or more dyes, to inks containing such compositions and to processes using said inks in printing and imaging technologies, especially ink jet printing.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The inks used in an ink jet printer are required to meet a number of criteria. For example, they preferably provide sharp, non-feathered images which have good water fastness, light fastness and optical density. Furthermore, the inks desirably dry quickly when applied to a substrate, however, they should not dry or crust over in the ink jet head as this can result in clogging of the ink jet nozzle. The inks are desirably storage stable over long periods of time without deterioration in the properties of the ink.

We have found that mixtures of certain dyes are valuable as colorants for ink jet printing inks. In particular we have surprisingly found that when the mixture of dyes is incorporated into an ink, the mixture shows a synergistic effect compared to the individual components providing improvements in solubility, operability and, particularly, in print optical density. Furthermore, inks incorporating the dye mixtures exhibit a rapid fixation on paper and give a black print on plain paper which exhibits little or no bronzing and a high water fastness.

According to a first aspect of the present invention, there is provided a composition comprising:

(i) a dye of Formula (1) or a salt thereof:

Formula (1)

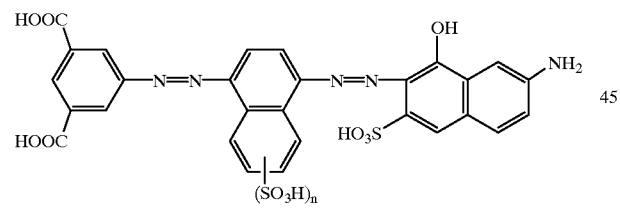

wherein n is 0 or 1; and (ii) at least one dye selected from a dye of the Formula (2), (3), (4), (5), (6), (7) and salts thereof:

Formula (2)

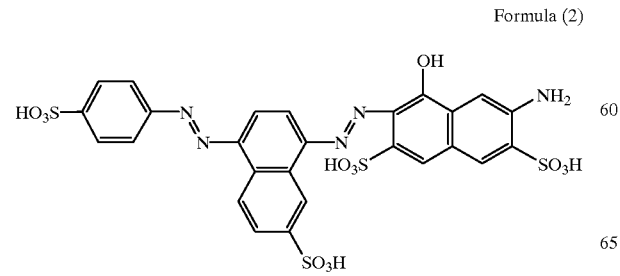

Formula (3)

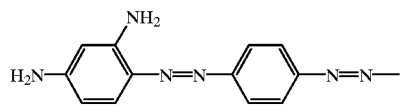

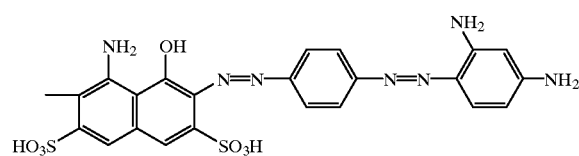

Formula (4)

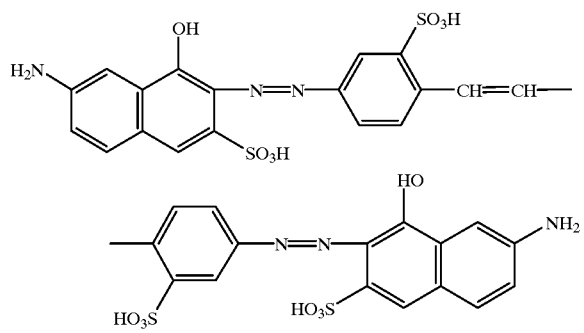

Formula (5)

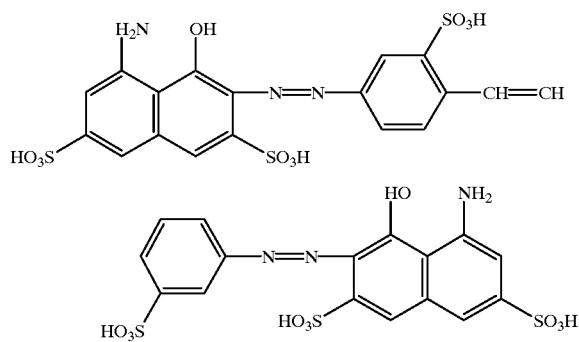

Formula (6)

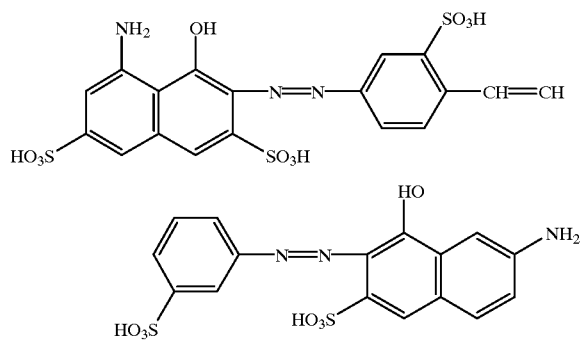

Formula (7)

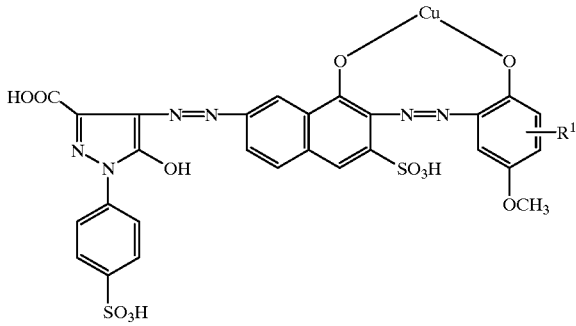

wherein:
R¹ is vinyl sulphonyl, hydroxyethyl sulphonyl or a group which is convertible to vinyl sulphonyl when treated with aqueous alkali.
Preferably n has a value of 0.
The composition preferably comprises:
(a) from 99.9 to 0.1 parts, more preferably from 70 to 10 parts of a dye of Formula (1); and
(b) from to 0.1 to 99.9 parts, more preferably from 30 to 90 parts in total of one or more dye(s) selected from the dyes of Formula (2), (3), (4), (5), (6) and (7);
wherein the parts are by weight and the sum of the parts (a) and (b)=100.

As will be understood, the composition may in addition to a dye of Formula (1) contain a single dye selected from the dyes of Formulae (2) to (7), or a mixture of two or more of the dyes of Formulae (2) to (7).

A preferred mixture of dyes of Formulae (2) to (7) comprises a mixture of the dyes of Formula (4), (5) and (6), more preferably a mixture comprising from 20 to 80 parts of the dye of Formula (4), from 20 to 80 parts of the dye of Formula (5) and from 20 to 80 parts of the dye of Formula (6), wherein the parts are by weight and the sum of the parts of the dyes of Formula (4), (5) and (6)=100. An especially preferred mixture of dyes of Formulae (2) to (6) comprises an approximately 1:1:1 mixture, by weight, of dyes of the Formula (4), (5) and (6).

When R¹ in the dye of Formula (7) is a group which is convertible to a vinyl sulphonyl group when treated with aqueous alkali it is preferably of the formula —SO₂CH₂CH₂OSO₃H, —SO₂CH₂CH₂SSO₃H, —SO₂CH₂CH₂Cl or —SO₂CH₂OCOCH₃. More preferably R¹ is —SO₂CH₂CH₂OH or, especially, —SO₂CH₂CH₂OSO₃H Preferably R¹ is attached in the para position relative to the azo group in the dye of Formula (7).

A preferred composition according to the first aspect of the present invention comprises from 90 to 10 parts of a dye of Formula (1); and from 10 to 90 parts of a dye of Formula (2); wherein the parts are by weight and the sum of the parts of the dye of Formula (1) and the dye of Formula (2)=100.

The dye of Formula (1) may be prepared using methods known in the art for the preparation of similar azo compounds. For example, a suitable method for the preparation of the dye of Formula (1) in the form of its sodium salt is disclosed in Example 2 of EP 0 356 080. The dye of Formula (1) may be converted into the free acid form or into a salt with a counter ion other than sodium by using well known techniques. For example, the alkali metal salts of the dye of Formula (1) may be converted into a salt with ammonia or an amine by dissolving the dye in the form of a salt with an alkali metal, acidifying with a mineral acid and adjusting the pH of the solution to pH 9 to 9.5 with ammonia or the amine and removing the alkali metal cations by dialysis. An example of a suitable process for converting the sodium salt of the dye of Formula (1) to the ammonium salt is an analogous one to that described in Example 21 of EP 0 356 080.

The dye of Formula (2) is Food Black 2 and is commercially available from Bayer.

The dye of Formula (3) is commercially available as Colour Index Direct Black 19. The dye of Formula (3) may be prepared using conventional techniques for the preparation of azo dyes. For example a suitable method comprises:

(1) diazotising 1,4-phenylenediamine using, for example, sodium nitrite in a mineral acid at 0 to 5° C.;

(2) coupling 8-amino-1-naphthol-3,6-disulphonic acid with an approximately equimolar quantity of the diazotised 1,4-phenylene diamine from stage (1) under slightly acidic conditions;

(3) adjusting the pH of the solution resulting from stage (2) so that it is alkaline, preferably in the range pH 8 to 9, and adding a further equimolar quantity of diazotised 1,4-phenylenediamine from stage (1); and (4) coupling the diazotised disazo dye formed in stage (3) with approximately 2 molar equivalents of 1,3-phenylenediamine to give the dye of Formula (3).

The dyes of Formulae (4) to (6) may be prepared using methods analogous to those used for the preparation of similar azo dyes. A suitable method comprises:

(1) diazotising 4,4'-diamino-stilbene-2,2'-disulphonic acid using, for example, sodium nitrite in a mineral acid at 0 to 5° C.; and (2) coupling the diazonium salt from stage (1) with approximately 2 molar equivalents of a compound XH, preferably under mildly alkaline conditions. For the dye of Formula (4) the compound XH is 2-amino-8-naphthol-6-sulphonic acid. For the dye of Formula (5) the compound XH is 8-amino-1-naphthol-3,6-disulphonic acid. For the dye of Formula (6) the compound XH is an approximately equimolar mixture of 8-amino-1-naphthol-3,6-disulphonic acid and 2-amino-8-naphthol-6-sulphonic acid.

The dye of Formula (7) wherein R¹ is —SO₂CH₂CH₂OSO₃H, is commercially available as Colour Index Reactive Black 31. The dye of Formula (7) may be prepared using conventional methods for the preparation of azo dyes. For example a suitable method comprises:

(1) diazotising 2-amino-8-naphthol-6-sulphonic acid and coupling the resultant diazonium salt with the pyrazolone compound of the formula:

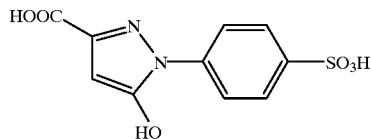

(2) diazotising the compound of the formula:

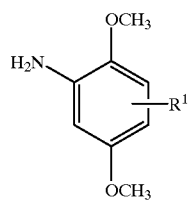

wherein $R^1$ is as hereinbefore defined;
(3) coupling the diazonium salt from stage (2) with the product of stage (1), preferably under alkaline conditions; and
(4) heating the azo dye formed in stage (3) in the presence of cuprammonium sulphate and a suitable alkanolamine, for example dihydroxyethylamine, to give the dye of Formula (7).

When $R^1$ is hydroxyethylsulphonyl, it is preferred that the dye is prepared by hydrolysing a dye of the Formula (7) wherein $R^1$ is $-SO_2CH_2CH_2OSO_3H$ under mildly alkaline conditions.

We have found that the addition of a yellow dye to a composition according to the first aspect of the present invention results in further improvements in print quality when the composition is incorporated into an ink for use in an ink jet printer. Accordingly, a second aspect of the present invention provides a composition comprising:

(i) a composition according to the first aspect of the present invention; and
(ii) a water-soluble yellow dye.

Preferably the water-soluble yellow dye is a water-soluble yellow azo dye, which carries one or (more preferably) two azo ($-N=N-$) groups, for example naphthyl azo, phenyl azo, azopyrazolone and azopyridone dyes. Preferred examples of water-soluble yellow azo dyes include Direct Yellow 86, Direct Yellow 132, Direct Yellow 142, Direct Yellow 173 and Acid Yellow 23, as listed in the Colour Index International.

Especially preferred water-soluble yellow azo dyes are selected from a dye of the Formula (8), Formula (9), Formula (10), Formula (11), Formula (12) and Formula (13) and salts and tautomers thereof:

Formula (8)

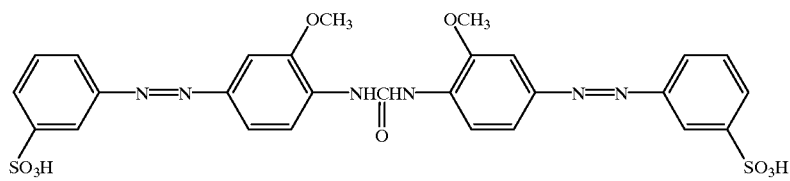

Formula (9)

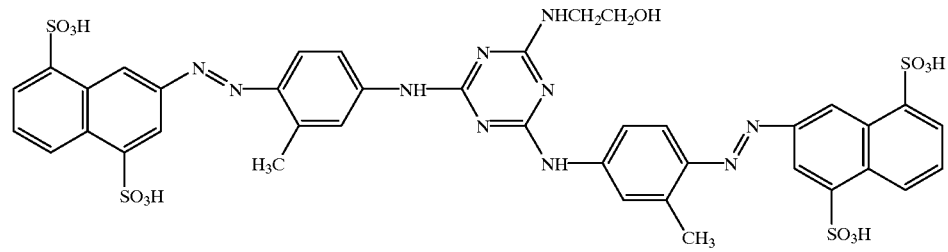

Formula (10)

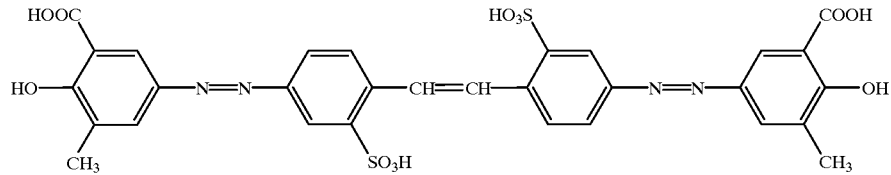

Formula (11)

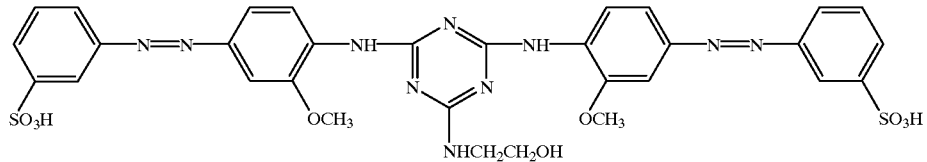

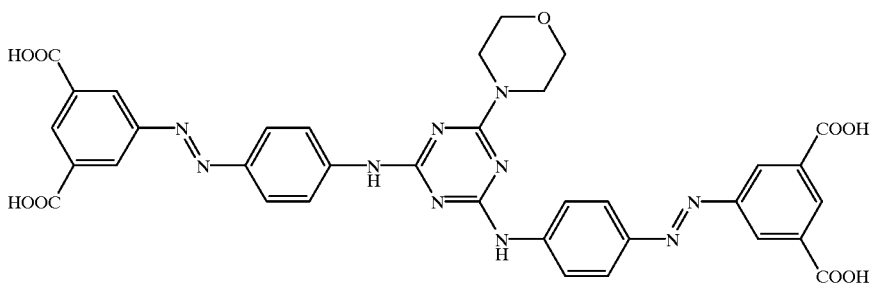

Formula (12)

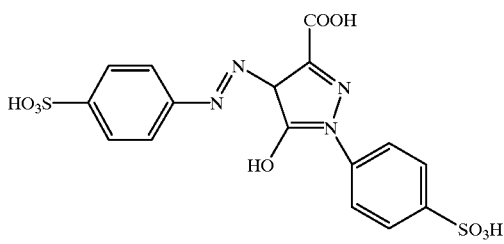

Formula (13)

The composition according to the second aspect of the present invention preferably comprises:
(i) from 0.1 to 50, more preferably from 2 to 30 parts of a water-soluble yellow azo dye;
(ii) from 99.9 to 0.1 parts, more preferably from 70 to 10 parts of a dye of Formula (1); and
(iii) from to 0.1 to 99.9 parts, more preferably from 30 to 70 parts in total of one or more dye(s) selected from the dyes of Formula (2), (3), (4), (5), (6) and (7);
wherein all parts are by weight and the sum of the parts (i), (ii) and (iii)=100.

Preferred water-soluble yellow azo dyes in component (i) are selected from the hereinbefore defined dyes of the Formula (8), (9), (10), (11), (12) and (13) and salts and tautomers thereof In a first preferred composition according to the second aspect of the present invention component (i) comprises a dye of Formula (8); and component (iii) comprises a dye of Formula (2).

In a second preferred composition according to the second aspect of the present invention component (i) comprises a dye of the Formula (10); and component (iii) comprises a mixture of dyes of the Formula (4), Formula (5) and Formula (6), more preferably an approximately 1:1:1 mixture of the dyes of the Formula (4), (5) and (6). It is especially preferred that components (i) and (iii) (the mixture of the dyes of the Formulae (4), (5), (6) and (10)) is Mobay Black™ SP which is commercially available from Bayer.

The dye of Formula (8) is commercially available as CI Direct Yellow 132. The dye may be prepared using conventional methods for the preparation of azo dyes, for example:
(1) diazotising 3-aminobenzene sulphonic acid; and
(2) coupling N,N'-bis(2-methoxyphenyl)urea with approximately 2 molar equivalents of the diazonium salt formed in stage (1).

The dye of Formula (9) is commercially available as CI Direct Yellow 86. The dye may be prepared using conventional methods for the preparation of azo dyes. For example a suitable process comprises:
(1) diazotising 2-naphthylamine-4,8-disulphonic acid;
(2) coupling the diazonium salt formed in stage (1) with an approximately equimolar quantity of 3-aminotoluene;
(3) condensing cyanuric chloride with approximately two molar equivalents of the product of stage (2); and
(4) condensing the monochloro triazine compound formed in stage (3) with an approximately equimolar quantity of 2-hydroxethylamine.

The dye of Formula (10) may be prepared using conventional methods. For example a suitable method comprises:
(1) diazotising 4,4'-diamino-stilbene-2,2'-disulphonic acid; and
(2) coupling the diazonium salt with approximately 2 molar equivalents of 2-hydroxy-3-methylbenzoic acid.

The dye of Formula (11) is commercially available as CI Direct Yellow 142 from Zeneca Limited.

The dye of Formula (12) may be prepared using the method described in Example 10 of EP 468 747.

The dye of Formula (13) is commercially available as CI Acid Yellow 23 from various manufacturers.

The compositions according to the second aspect of the present invention are particularly useful when incorporated into inks for use in ink jet printers because they provide high quality prints with a good optical density and a particularly desirable neutral black shade.

We have found that the addition of a water-soluble cyan dye to a composition according to the second aspect of the present invention results in further improvements in print quality when the composition is incorporated into an ink. Accordingly, a third aspect of the present invention provides a composition comprising:
(i) a composition according to the second aspect of the present invention; and
(ii) a water-soluble cyan dye.

The water-soluble cyan dye is preferably a water-soluble phthalocyanine dye, more preferably C.I. Direct Blue 199, C.I. Acid Blue 9, C.I. Direct Blue 307 or C.I. Reactive Blue 71.

Preferably the composition according to the third aspect of the present invention comprises up to 30, more preferably from 0.5 to 20 and especially from 1 to 10 parts by weight of water-soluble cyan dye.

A preferred composition according to the third aspect of the present invention comprises:
(i) from 0.1 to 30, more preferably 0.5 to 10 parts of a water-soluble cyan dye;
(ii) from 0.1 to 50, more preferably from 2 to 30 parts by weight of a water-soluble yellow azo dye;
(iii) from 99.9 to 0.1 parts, more preferably from 70 to 10 parts of a dye of Formula (1); and
(iv) from to 0.1 to 99.9 parts, more preferably from 30 to 70 parts in total of one or more dye(s) selected from the dyes of Formula (2), (3), (4), (5), (6) and (7);
wherein all parts are by weight and the sum of the parts (i), (ii), (iii) and (iv)=100.

A preferred composition according to the third aspect of the present invention is where component (i) is selected from C.I. Acid Blue 9, C.I. Direct Blue 199, C.I. Direct Blue 307 and C.I. Reactive Blue 71; component (ii) is selected from C.I. Direct Yellow 86, C.I. Direct Yellow 132, C.I. Direct Yellow 142, C.I. Direct Yellow 173, C.I. Acid Yellow 23 and a dye of Formula (10); and component (iv) is selected from a dye of the Formulae (2), (3), (7) and an approximately 1:1:1 mixture of the dyes of Formulae (4), (5) and (6).

The compositions according to the third aspect of the present invention provide high quality prints with a desirable neutral black shade when incorporated into inks for use in ink jet printers.

The dyes present in the compositions according to the first, second and third aspects of the present invention may be in free acid form but are preferably in the form of water-soluble salts. Preferred salts are alkali metal salts, especially lithium, sodium and potassium salts; ammonium; substituted ammonium and mixed salts thereof. Especially preferred salts are those formed with sodium, lithium, ammonia and volatile amines. The dyes may be converted to the desired salt form using conventional techniques. For example, the dye may be precipitated in its free acid form by adding an appropriate acid to an aqueous solution of the dye. The acid form of the dye may then be treated with a suitable base, for example $NH_4OH$, to yield the desired salt. Alternatively, ion exchange techniques can be used convert the dyes to the desired salt forms.

The dyes in the compositions of the present invention may be, and preferably are, purified before they are incorporated into inks for ink jet printing. Conventional techniques may be employed for purifying the dyes, for example osmosis and/or dialysis.

According to a fourth aspect of the present invention, there is provided an ink composition comprising:
(i) a composition according to the first, second or third aspect of the present invention; and
(ii) a liquid medium or a low melting point solid medium.

The ink preferably contains from 0.5 to 20%, more preferably from 0.5 to 15%, and especially from 1 to 8% by weight based upon the total weight of the ink of the composition according to the first, second or third aspects of the present invention. The preferred dye compositions present in the ink are as hereinbefore defined for the first and second aspects of the present invention.

It is preferred that when the medium is a liquid, that the components present in the composition according to the first or second aspect of the present invention are dissolved completely in the medium to form a solution. Preferably the dyes present in the ink have a solubility of 10% or more in the medium because this allows the preparation of concentrates which may be used to prepare more dilute inks and to minimise the chance of precipitation of colorant if evaporation of the liquid medium occurs during storage of the ink.

When the medium is a liquid it preferably comprises water, a mixture of water and one or more organic solvent(s), or an organic solvent.

When the medium comprises a mixture of water and one or more organic solvent(s), the weight ratio of water to organic solvent(s) is preferably from 99:1 to 1:99, more preferably from 99:1 to 50:50 and especially from 95:5 to 80:20.

It is preferred that the organic solvent(s) present in the mixture of water and organic solvent(s) are water-soluble organic solvent(s). Preferred water-soluble organic solvent(s) are selected from $C_{4-6}$-alkanols, for example methanol, ethanol, n-propanol, isopropanol, n-butanol, sec-butanol, tert-butanol, isobutanol and n-pentanol; cyclic alkanols, for example cyclohexanol and cyclopentanol; diols, preferably diols with 2 to 12 carbon atoms, for example pentane-1,5-diol and hexane-1,6-diol; amides, for example dimethylformamide or dimethylacetamide; amines, for example triethanolamine ethanolamine and diethanolamine; ketones or ketone-alcohols, for example acetone, methyl ether ketone, cyclohexanone and diacetone alcohol; ethers, for example tetrahydrofuran or dioxane; oligo- or polyalkyleneglycols, for example diethylene glycol, triethylene glycol, hexylene glycol, polyethylene glycol and polypropylene glycol; alkyleneglycols or thioglycols containing a $C_2$–$C_6$-alkylene group, for example ethylene glycol, propylene glycol, butylene glycol, pentylene glycol hexylene glycol and thiodiglycol; polyols, for example glycerol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy] ethanol, 2-[2-(2-ethoxyethoxy)-ethoxy]-ethanol, 2-(2-butoxyethoxy)ethanol and ethyleneglycolmonoallylether; cyclic amides, for example 2-pyrrolidone, N-methyl-2-pyrrolidone, N-ethyl-2-pyrrolidone, caprolactam and 1,3-dimethylimidazolidone; cyclic esters, for example caprolactone γ-butyrolactone; sulphoxides, for example dimethyl sulphoxide and sulpholane or mixtures containing two or more, especially from 2 to 8, of the aforementioned water-soluble organic solvents, for example thiodiglycol and a second glycol or diethylene glycol and 2-pyrrolidone.

Especially preferred water-soluble organic solvents are 2-pyrrolidone; N-methylpyrrolidone; alkylene- and oligoalkylene-glycols, for example ethyleneglycol, diethyleneglycol, triethyleneglycol; and lower alkyl ethers of polyhydric alcohols, for example 2-methoxy-2-ethoxy-2-ethoxyethanol; and polyethyleneglycols with a molecular weight of up to 500.

A preferred mixture of water and water-soluble organic solvents comprises:
(a) from 60 to 80 parts water; and
(b) from 0.5 to 25 parts in total of one or more solvents selected from diethylene glycol,2-pyrrolidone, N-methylpyrrolidone, cyclohexanol, caprolcatone, caprolactam, pentane-1,5-diol, 2-(2-butoxyethoxy) ethanol and thiodiglycol;
wherein the parts are by weight and the sum of the parts (a) and (b)=100.

Examples of further suitable ink media comprising a mixture of water and one or more organic solvent(s) are given in U.S. Pat. No. 4,963,189, U.S. Pat. No. 4,703,113, U.S. Pat. No. 4,626,284 and EP 4,251,50A which are incorporated herein by reference thereto.

When the medium comprises an organic solvent it preferably has a boiling point of from 0 to 300° C., more preferably of from 50 to 200° C. The organic solvent may be water-immiscible or water-soluble. Preferred water-soluble organic solvents are any of the hereinbefore mentioned water-soluble organic solvents Preferred water-immiscible solvents include, for example, aliphatic hydrocarbons, esters, for example ethyl acetate, chlorinated hydrocarbons, for example $CH_2Cl_2$ and ethers, for example diethyl ether.

When the medium comprises a water-immiscible organic solvent a polar solvent such as an alcohol, ester, ether or amide is preferably added to enhance the solubility of the dyes in the medium. In view of the foregoing preferences it is especially preferred that where the medium comprises an organic solvent, it is selected from ketones, especially methyl ethyl ketone and alkanols especially ethanol and n-propanol.

The organic solvent medium may comprise a single organic solvent or a mixture of two or more organic solvents. It is preferred that the medium comprises a mixture of 2 to 5 different organic solvents because this allows a medium to be selected which gives optimum control over the characteristics of the ink.

Ink media comprising an organic solvent are used where fast drying times are required and particularly when printing onto hydrophobic and non absorbent substrates such as plastics, metal or glass.

When the medium for an ink composition comprises a low melting point solid, the melting point of the solid is preferably in the range from 60° C. to 125° C. Suitable low melting point solids include long chain fatty acids or alcohols, preferably those with $C_{18-24}$ chains and sulphonamides. The composition according to the first aspect of the present invention may be dissolved in the low melting point solid or may be finely dispersed in it.

The compositions according to the first and second aspects of the present invention are particularly useful as colorants for aqueous inks because they exhibit high solubility in water and in aqueous media. Accordingly, it is preferred that the ink medium is water or, more preferably a mixture of water and one or more water-soluble organic solvent(s).

In view of the forgoing preferences, a particularly preferred ink composition comprises:

(a) 1 to 10 parts of a dye of Formula (1);
(b) 1 to 10 parts in total of one or more dyes selected from the dye(s) of Formula (2), (3), (4), (5), (6) and (7);
(c) 0 to 5, more preferably 0 to 4 parts of a water-soluble yellow azo dye;
(d) 0 to 5, more preferably 0 to 3 parts of a water-soluble cyan dye;
(e) 2 to 60, more preferably 10 to 40, parts of water-soluble organic solvent(s); and
(f) 1 to 95, more preferably 40 to 85 parts water;

wherein all parts are parts by weight and the sum of the parts (a), (b), (c), (d), (e) and (f)=100.

In addition to the components (a), (b), (c), (d), (e) and (f) the ink may contain other additional components conventionally used in ink jet printing inks, for example viscosity and surface tension modifiers, corrosion inhibitors, kogation reducing additives, and surfactants which may be ionic or non-ionic.

According to a fifth aspect of the present invention, there is provided a process for printing a substrate with an ink composition using an ink jet printer wherein the ink composition is as defined for the fourth aspect of the present invention.

The ink jet printer preferably applies the ink to the substrate in the form of droplets which are ejected through a small orifice onto the substrate.

Preferred ink jet printers are drop on demand (DOD) and continuous ink jet printers. In DOD ink jet printing small droplets of ink are ejected from a reservoir through a small orifice in response to an electrical recording signal so that the droplets of ink are directed at a substrate. Preferred DOD ink jet printers are piezoelectric ink jet printers and thermal ink jet printers. In thermal ink jet printing, programmed pulses of heat are applied to the ink in the reservoir by means of a resistor adjacent to the orifice, during relative movement between the substrate and the reservoir. In piezoelectric printers the ink reservoir is formed from a suitable piezoelectric material which expands and contacts in response to an electrical recording signal and thereby ejects ink droplets from the nozzle towards the substrate.

In continuous ink jet printers a stream of ink droplets are ejected from a small orifice and electrical fields are used to either direct the droplets towards a substrate or into a gutter for recycling. When a continuous ink jet printing technique is used the ink composition preferably also contains a conducting material such as an ionised salt to enhance and stabilise the charge applied to the ink drops during ejection from the printer head. Suitable salts for this purpose are alkali metal salts of mineral acids.

The substrate used in the ink jet printing process is preferably paper, plastic, textile, metal or glass, more preferably paper, an overhead projector slide or a textile material, and especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper.

Preferred textile materials are natural, synthetic and semi-synthetic materials Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferred ink compositions for use in the process according to the fifth aspect of the present invention are the preferred inks hereinbefore defined in the fourth aspect of the present invention.

According to a sixth aspect of the present invention, there is provided a paper an overhead projector slide or a textile material printed with an ink composition as hereinbefore defined for the fourth aspect of the present invention, or by means of the process according to the fifth aspect of the present invention.

According to a seventh aspect of the present invention there is provided an ink jet printer cartridge containing an ink according to the fourth aspect of the present invention.

The invention is further illustrated by the following Examples in which all parts and percentages are by weight unless otherwise stated. In the Examples reference is made to the accompanying drawings in which.

Figure 1:
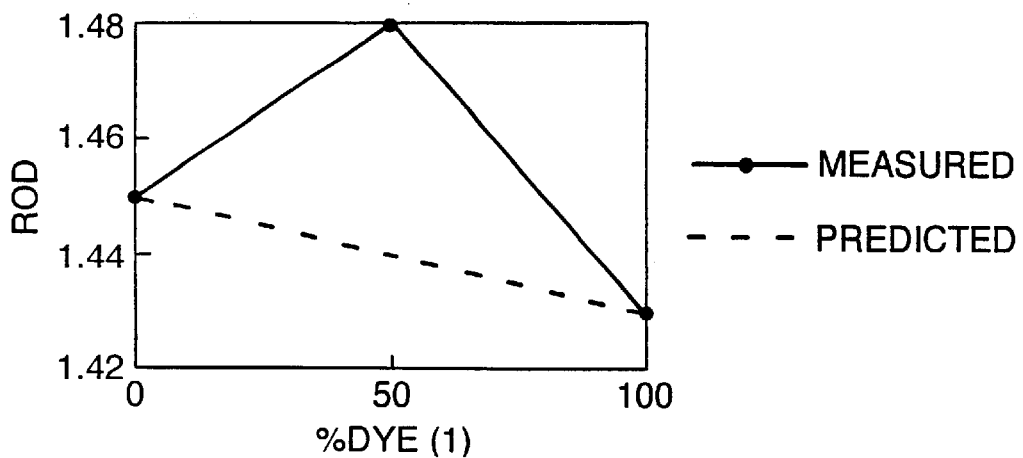
FIG. 1 shows the reflected optical density of a print prepared using an ink containing a mixture of Dye(1) and Dye(2)
Figure 2:
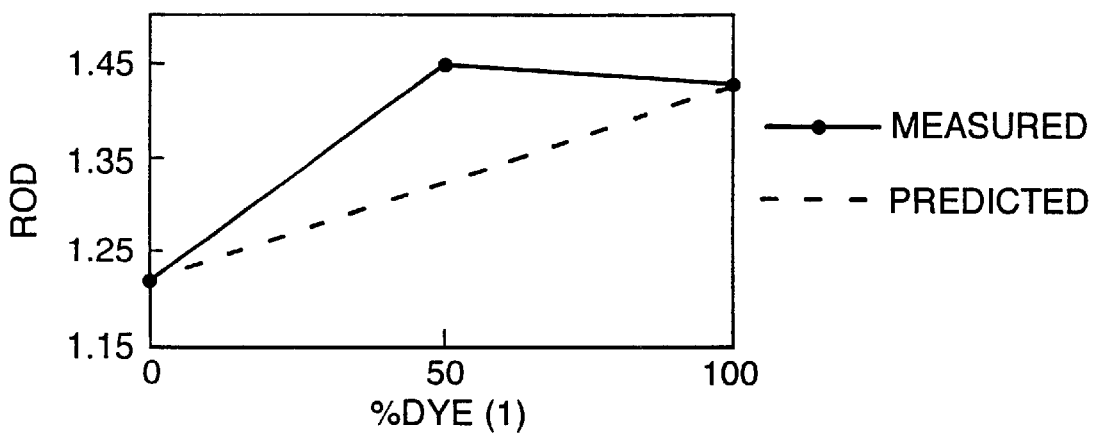
FIG. 2 shows the reflected optical density of a print prepared using an ink containing a mixture of Dye(1) and Dye(3)

In each of FIGS. 1 to 5 the dotted line on the graph shows the expected linear variation between the reflected optical density of a print prepared using an ink containing a dye of Formula (1) alone and the reflected optical density of a print prepared using an ink containing a dye of the formula (2), (3), (4), (5), (6) or (7) alone. The solid line on the graphs shows the measured values of reflected optical density (ROD) of a print prepared using an ink containing a composition according to the present invention. In each case a clear synergistic effect is obtained when the inks contain a mixture of dyes according to the present invention.

EXAMPLE 1

Dye (1)

The ammonium salt of the dye of Formula (1):

Formula (1)

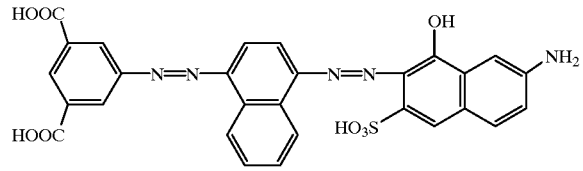

Dye (1) was prepared as follows:

The dye of the Formula (1) was prepared in the form of its sodium salt using the same process described in Example 2 of EP 0 356 080. The sodium salt of the dye was then converted into the ammonium salt using an analogous method to that described in Example 21 of EP 0 356 080.

Dye (2)

Sodium salt of the dye of the Formula (2):

Formula (2)

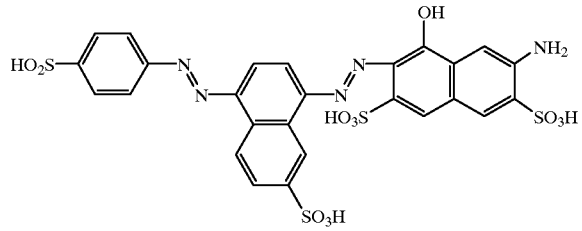

Dye (2) is commercially available as Food Black 2 from Bayer.

Ink Formulation

Ink 1

| Component | Parts |
|---|---|
| Dye (1) | 2.5 |
| Dye (2) | 2.5 |
| Thiodiglycol | 9 |
| 2-Pyrrolidone | 9 |
| Cyclohexanol | 2 |
| Water | 75 |

Ink 1 was prepared as follows:

Dye (1) (2.5 g) and Dye (2) (2.5 g) were dissolved in water (75 g) by adding 0.88M ammonia solution to adjust the pH to 9.5. Thiodiglycol (9 g), 2-pyrrolidone (9 g) and cyclohexanol (2 g) were all added to the solution of the dyes and the mixture was stirred at room temperature. The ink was then filtered through a 0.45 μm filter to remove particulate matter.

Ink Jet Printing

Ink 1 was applied to Wiggins Conqueror paper using a Hewlett-Packard HP-560 ink jet printer. The reflected optical density (ROD) of the resulting prints was 1.48, as measured using an X-Rite™ spectrodensitometer.

COMPARATIVE EXAMPLES 1 and 2

The following comparative inks, with the formulations shown below, were formulated using the same method described for the preparation of Ink 1.

Comparative Ink 1

| Component | Parts |
|---|---|
| Dye (1) | 5.0 |
| Thiodiglycol | 9.0 |
| 2-Pyrrolidone | 9.0 |
| Cyclohexanol | 2.0 |
| Water | 75 |

Comparative Ink 2

| Component | Parts |
|---|---|
| Dye (2) | 5.0 |
| Thiodiglycol | 9.0 |
| 2-Pyrrolidone | 9.0 |
| Cyclohexanol | 2.0 |
| Water | 75 |

The Comparative inks were printed onto Wiggins Conqueror paper using an ink jet printer as described in Example 1. The optical density of the resulting prints was measured using the same method described in Example 1. The measured optical density for each ink is shown in Table 1.

TABLE 1

| Ink | Reflected Optical Density (ROD) |
| --- | --- |
| Ink 1 | 1.48 |
| Comparative Ink 1 | 1.43 |
| Comparative Ink 2 | 1.45 |

The results in Table 1 clearly show the synergistic effect obtained from inks containing a mixture of Dye (1) and Dye (2). The inks according to the present invention give prints with a higher reflected optical density than would be expected based upon the measurement of the optical density of the prints obtained from an ink containing Dye (1) alone and an ink containing Dye (2) alone. Furthermore, Ink 1 which contained a mixture of Dye (1) and Dye (2) gave prints with a higher optical density than either Comparative Ink 1 or Comparative Ink 2. The synergistic effect obtained from an ink containing a mixture of Dye (1) and Dye (2) is further illustrated in FIG. 1.

EXAMPLE 2

Dyes
Dye (1) was the same dye used in Example 1.
Dye (3) the diethanolamine salt of the dye the Formula (3):

printed onto Wiggins Conqueror paper and the reflected optical density of the resulting prints was measured as described in Example 1.

TABLE 2

| Ink | Dye (1) | Dye (3) | 2-P | TDG | CHX | Water | ROD |
| --- | --- | --- | --- | --- | --- | --- | --- |
| Ink 2 | 2.5 | 2.5 | 9 | 9 | 2 | 75 | 1.45 |
| Comparative Ink 3 | 0 | 5 | 9 | 9 | 2 | 75 | 1.22 |
| Comparative Ink 1 | 5 | 0 | 9 | 9 | 2 | 75 | 1.43 |

In Table 2 the following abbreviations have been used:

2-P: 2-Pyrrolidone

TDG: Thiodiglycol

CHX: Cyclohexanol

ROD: Reflected Optical Density

Formula (3)

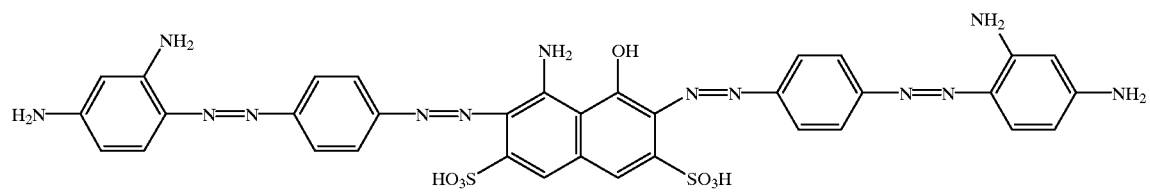

The sodium salt of the dye of Formula (3) is commercially available as Direct Black 19. The sodium salt of the dye of Formula (3) was then converted into the diethanolamine salt using an analogous method to that described in Example 21 of EP 0 356 080.

Inks and Ink Jet Printing

The inks shown in Table 2 were formulated using the method described in Example 1. The inks were then ink jet FIG. 2 and Table 2 both clearly show the synergistic effect obtained from an ink containing a mixture of Dye (1) and Dye (3), compared with inks containing the individual dyes alone.

EXAMPLE 3

Dyes
Dye (1) was the same dye used in Example 1.
Dye (4) the sodium salt of the dye of the Formula (7):

Formula (7)

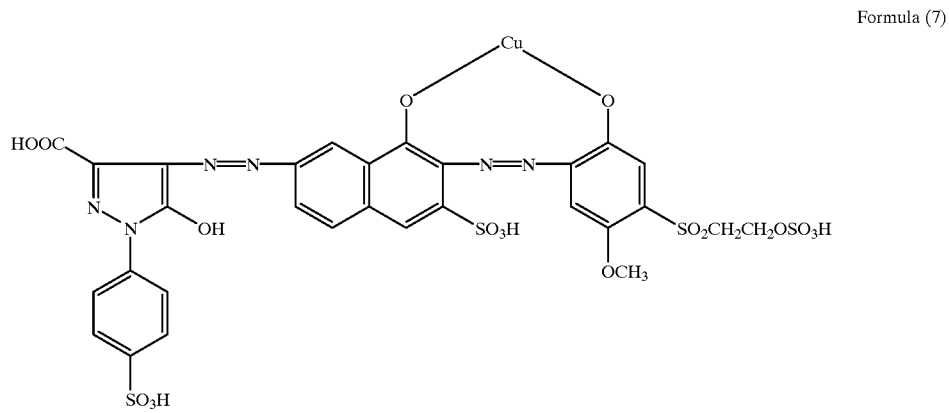

Dye (4) is commercially available as Remazol Black™ RL from Hoechst.

Inks and Ink Jet Printing

The inks shown in Table 3 were prepared as using the method described in Example 1. The inks were then ink jet printed onto Wiggins Conqueror paper and the reflected optical density of the resulting prints was measured as, described in Example 1.

TABLE 3

| Ink | Component (Parts) | | | | | | |
|---|---|---|---|---|---|---|---|
| | Dye (1) | Dye (4) | 2-P | TDG | CHX | Water | ROD |
| Ink 4 | 2.5 | 2.5 | 9 | 9 | 2 | 75 | 1.46 |
| Comparative Ink 5 | 0 | 5.0 | 9 | 9 | 2 | 75 | 1.42 |
| Comparative Ink 1 | 5.0 | 0 | 9 | 9 | 2 | 75 | 1.43 |

The abbreviations in Table 3 are the same as those used in Table 2.

Figure 3:
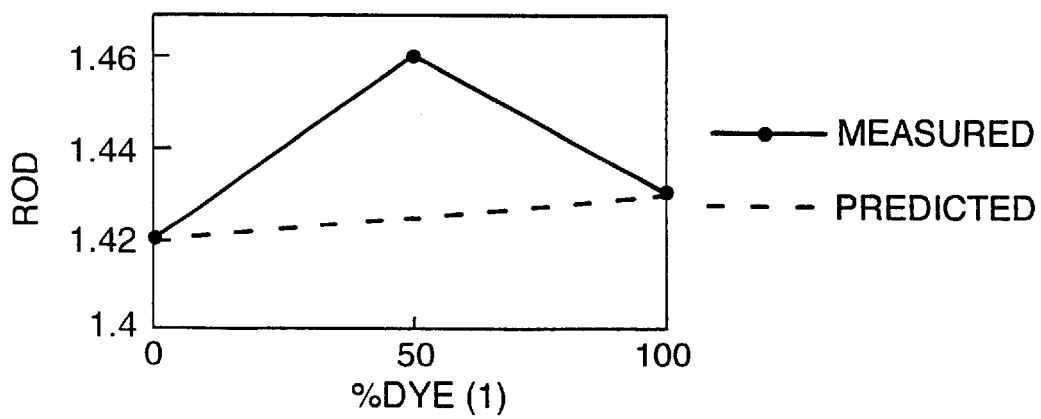
FIG. 3 shows the reflected optical density of a print prepared using an ink containing a mixture of Dye(1) and Dye(4)

FIG. 3 shows the synergistic effect obtained from an ink containing a mixture of Dye (1) and Dye (4).

EXAMPLE 4

Dyes

Dye (1) was as used in Example 1.

Dye (5) was Mobay Black SP™ which is commercially available from Bayer. This is a mixture comprising essentially of the hereinbefore described dyes of the Formula (4), (5), (6) and (10).

Inks and Ink Jet Printing

The inks shown in Table 4 were prepared using the method described in Example1. The inks were then ink jet printed onto Wiggins Conqueror paper and the reflected optical density was measured as described in Example 1.

TABLE 4

| Ink | Component (Parts) | | | | | | |
|---|---|---|---|---|---|---|---|
| | Dye (1) | Dye (5) | 2-P | TDG | CHX | Water | ROD |
| Ink 5 | 2.5 | 2.5 | 9 | 9 | 2 | 75 | 1.47 |
| Comparative Ink 5 | 0 | 5 | 9 | 9 | 2 | 75 | 1.22 |
| Comparative Ink 1 | 5 | 0 | 9 | 9 | 2 | 75 | 1.43 |

The abbreviations used in Table 4 are the same as those used in Table 2.

Figure 4:
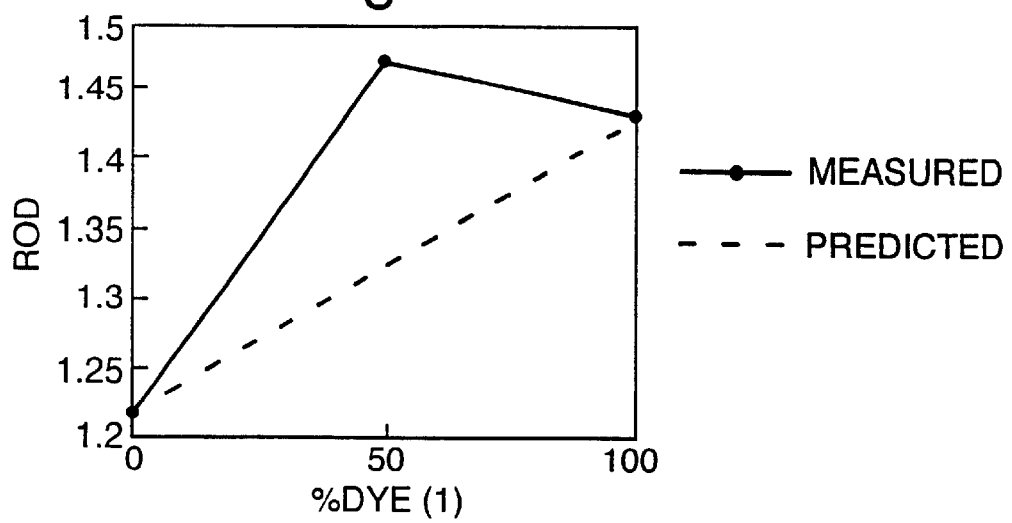
FIG. 4 shows the reflected optical density of a print prepared using an ink containing a mixture of Dye(1) and Dye(5)
Figure 5:
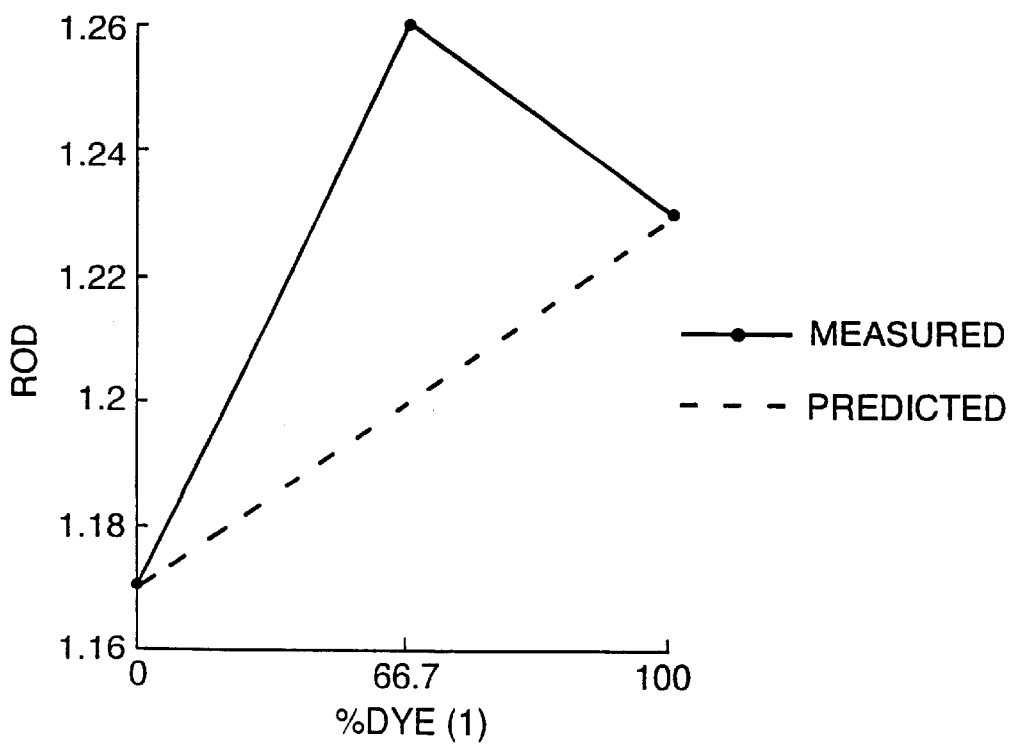
FIG. 5 shows the reflected optical density of a print prepared using an ink containing a mixture of Dye(1), Dye(3) and water soluble yellow Dye(6).

FIG. 4 shows the synergistic effect obtained when Dye (1) and Dye (5) are used as a mixture in an ink for ink jet printing.

EXAMPLE 5

Dye

Dye (1) was as used in Example 1.

Dye (6) was C.I. Direct Yellow 132 which is commercially available from Zeneca Limited.

Dye (3) was as used in Example 2.

Inks and Ink Jet Printing

The inks shown in Table 5 were prepared using a method analogous to that described in Example 1. The inks were then ink jet printed onto Wiggins Conqueror paper and the reflected optical density of the resulting prints was measured as described in Example 1.

TABLE 5

| Inks | Component (Parts) | | | | | | | | |
|---|---|---|---|---|---|---|---|---|---|
| | Dye (1) | Dye (3) | Dye (6) | BC | NMP | DEG | Surf | Water | ROD |
| Ink 5 | 4 | 2 | 2 | 10 | 5 | 5 | 1 | 71 | 1.26 |
| Comparative Ink 6 | 6 | 0 | 2 | 10 | 5 | 5 | 1 | 71 | 1.23 |
| Comparative Ink 7 | 0 | 6 | 2 | 10 | 5 | 5 | 1 | 71 | 1.17 |

The following abbreviations have been used in Table 5:

BC: Butyl Carbitol™ [2-(2-butyoxyethoxy)ethanol]
NMP: N-methyl pyrrolidone
DEG: Diethylene glycol
Surf: Surfynol™ 465 (a surfactant commercially available from Air Products Inc)
ROD: Reflected optical density FIG. 5 clearly illustrates the synergistic effect obtained when the ink contains a mixture of the black dyes, Dye (1) and Dye (3) with the yellow dye, Dye (6) compared with inks containing Dye (1) and Dye (6) alone, and Dye (3) and Dye (6) alone.

EXAMPLE 6

Further dye compositions may be prepared having the following ingredients and amounts shown in Tables 6 and 7. The amounts quoted in Tables 6 and 7 refer to the number of parts by weight of each component. Dyes (1) to (6) are as described in Examples 1 to 5.

TABLE 6

| Component | Composition No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Dye(1) | 25 | 36 | 47 | 72 | 66 | 32 | 15 | 80 | 68 | 62 | 50 | 77 | 44 | 60 | 47 |
| Dye(2) | 75 | | | | | 65.5 | | | | 31.8 | 43.5 | 10.5 | | | |
| Dye(3) | | 64 | | | | | 79 | | 23 | | | 10 | 56 | | 43 |
| Dye(4) | | | 53 | | 30 | | | | 14 | | | | | 40 | |
| Dye(5) | | | | 23 | | | | 14 | | | | | | | |

TABLE 6-continued

|  | Composition No. | | | | | | | | | | | | | | |
| Component | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Dye(6) | | | | | | | | | | 5 | 6 | 2.5 | | | 10 |
| CI Direct Yellow 142 | | | | 5 | | | 3 | | | | | | | | |
| CI Direct Yellow 86 | | | | | | 4 | | 5 | | | | | | | |
| CI Acid Yellow 23 | | | | | 2.5 | | | | 5 | | | | | | |
| CI direct Blue 199 | | | | | | | 3 | | | | | | | | |
| CI Direct Blue 307 | | | | | | | | 1 | | | | | | | |
| CI Direct Blue 9 | | | | | | | | | 4 | | | | | | |
| CI Reactive Blue 71 | | | | | | | | | | | | | 1.2 | 0.5 | |

TABLE 7

|  | Composition No. | | | | | | | | | | | | | | |
| Component | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Dye(1) | 18 | 15 | 17 | 23 | 24 | 90 | 50.5 | 5 | 3 | 1 | 92 | 43 | 3.8 | 80 | 36 |
| Dye(2) | | | 83 | | | | | 89 | | | | 1.5 | | | 54 |
| Dye(3) | 82 | | | | 72 | | | | 88 | | | 54.5 | | | |
| Dye(4) | | | | 72 | | | | | | 92.8 | | | | | |
| Dye(5) | | 85 | | | | 7.5 | | | | | | | 96.2 | 20 | |
| Dye(6) | | | | | | | 43.5 | | | 5 | 6 | 2.5 | | | 10 |
| CI Direct Yellow 142 | | | | 5 | | | 3 | | | | | | | | |
| CI Direct Yellow 86 | | | | | | 4 | | 5 | | | | | | | |
| CI Acid Yellow 23 | | | | | 2.5 | | | | 5 | | | | | | |
| CI direct Blue 199 | | | | | | | 3 | | | | | | | | |
| CI Direct Blue 307 | | | | | | | | 1 | | | | | | | |
| CI Direct Blue 9 | | | | | | | | | 4 | | | | | | |
| CI Reactive Blue 71 | | | | | | | | | | | | | 1.2 | 0.5 | |

EXAMPLE 7

Inks (8) to (67) may be prepared having compositions described in Tables 8, 9 and 10 wherein the second column identifies the relevant dye composition from Table 6 or 7. The third column shows the amount of dye composition in the ink. All amounts are parts by weight. Thus, by way of example Ink (10) comprises:

(a) 10 parts Composition (2) shown in Table 6 (36 parts of Dye (1) and 64 parts of Dye (3));

(b) 85 parts water;

(c) 3 parts propylene glycol;

(d) 3 parts N-methyl pyrrolidone;

(e) 3 parts pentane-1,5-diol;

(f) 5 parts glycerol; and (g) 1 part 2-pyrrolidone

The inks may be applied to paper by thermal or piezo ink jet printing.

The following abbreviations are used in Tables 8, 9 and 10:

PG=propylene glycol
DEG=diethylene glycol
NMP=N-methyl pyrrolidone
DMK=dimethylketone
MEOH=methanol
2P=2-pyrrolidone
MIBK=methylisobutyl ketone
P12=propane-1,2-diol
UR=Urea
CET=cetyl ammonium bromide
PHO=$Na_2HPO_4$ and
TBT=tertiary butanol
TDG=thiodiglycol
GLY=glycerol
P-1,5=Pentane-1,5-diol
PEG 200=Polyethylene glycol (average molecular weight of 200)
H-1,6=Hexane 1,6-diol
CAP=caprolactone
CAP-L=caprolactam
TEA=triethanolomine
DEG-MBE=diethylene glycol monobutyl ether
EA=ethanolamine
BUT=γ-butyrolactone

TABLE 8

| Ink | Dye Composition | Dye Content | Water | PG | DEG | NMP | P-1,5 | TEA | DEA | BUT | CAP | EA | CAP-L |
|---|---|---|---|---|---|---|---|---|---|---|---|---|---|
| 8 | 1 | 2.0 | 80 | 5 | | 6 | 4 | | | | | 5 | |
| 9 | 3 | 3.0 | 90 | | 5 | 5 | | 0.2 | | | | | |
| 10 | 2 | 10.0 | 85 | 3 | | 3 | 3 | | | 5 | | 1 | |
| 11 | 4 | 2.1 | 91 | | 8 | | | | | | | | 1 |

TABLE 8-continued

| Ink | Dye Composition | Dye Content | Water | PG | DEG | NMP | P-1,5 | TEA | DEA | BUT | CAP | EA | CAP-L |
|---|---|---|---|---|---|---|---|---|---|---|---|---|---|
| 12 | 5 | 3.1 | 86 | 5 | | | | | 0.2 | 4 | | | 5 |
| 13 | 6 | 1.1 | 81 | | | 9 | | 0.5 | 0.5 | | | 9 | |
| 14 | 7 | 2.5 | 60 | 4 | 15 | 3 | 3 | | | 6 | 10 | 5 | 4 |
| 15 | 8 | 5 | 65 | | 20 | | | | | 10 | | | |
| 16 | 9 | 2.4 | 75 | 5 | 4 | | 5 | | | | 6 | | 5 |
| 17 | 10 | 4.1 | 80 | 3 | 5 | 2 | 10 | | 0.3 | | | | |
| 18 | 11 | 3.2 | 65 | | 5 | 4 | 6 | | | 5 | 4 | 6 | 5 |
| 19 | 12 | 5.1 | 96 | | | | | | | | 4 | | |
| 20 | 13 | 10.8 | 90 | 5 | | | | | | 5 | | | |
| 21 | 14 | 10.0 | 80 | 2 | 6 | 2 | 5 | | | 1 | | 4 | |
| 22 | 15 | 1.8 | 80 | | 5 | | | | | | | 15 | |
| 23 | 16 | 2.6 | 84 | | | 11 | | | | | | 5 | |
| 24 | 17 | 3.3 | 80 | 2 | | | 10 | | | | 2 | | 6 |
| 25 | 18 | 12.0 | 90 | | | | 7 | 0.3 | | 3 | | | |
| 26 | 19 | 5.4 | 69 | 2 | 20 | 2 | 1 | | | | | 3 | 3 |
| 27 | 20 | 6.0 | 91 | | | 4 | | | | | | 5 | |

TABLE 9

| Ink | Dye Composition | Dye Content | Water | PG | DEG | NMP | CET | TBT | TDG | UR | PHO | 2P | PI2 |
|---|---|---|---|---|---|---|---|---|---|---|---|---|---|
| 28 | 21 | 3.0 | 80 | 15 | | | 0.2 | | | | | 5 | |
| 29 | 22 | 9.0 | 90 | | 5 | | | | | | 1.2 | | 5 |
| 30 | 23 | 1.5 | 85 | 5 | 5 | | 0.15 | 4.64 | 0.2 | | | | |
| 31 | 24 | 2.5 | 90 | | 6 | 3.88 | | | | | 0.12 | | |
| 32 | 25 | 3.1 | 82 | 4 | 8 | | 0.3 | | | | | | 5.7 |
| 33 | 26 | 0.9 | 85 | | 10 | | | | | 5 | 0.2 | | |
| 34 | 27 | 8.0 | 90 | | 4.7 | 5 | | | 0.3 | | | | |
| 35 | 28 | 4.0 | 70 | | 10 | 4 | | | | 1 | | 4 | 11 |
| 36 | 29 | 2.2 | 75 | 4 | 10 | 3 | | | | 2 | | 6 | |
| 37 | 30 | 10.0 | 91 | | | 6 | | | | | | 3 | |
| 38 | 6 | 9.0 | 76 | | 9 | 7 | | 2.05 | | | 0.95 | 5 | |
| 39 | 1 | 5.0 | 78 | 5 | 11 | | | | | | | 6 | |
| 40 | 4 | 5.4 | 86 | | | 7 | | | | | | 7 | |
| 41 | 2 | 2.1 | 70 | 5 | 5 | 5 | 0.1 | 0.2 | 0.1 | 5 | 0.1 | 9.5 | |
| 42 | 2 | 2.0 | 90 | | 10 | | | | | | | | |
| 43 | 1 | 2 | 88 | | | | | | 10 | | | | |
| 44 | 23 | 5 | 78 | | | 5 | | | 12 | | | 5 | |
| 45 | 10 | 8 | 70 | 2 | | 8 | | | 15 | | | 5 | |
| 46 | 14 | 10 | 80 | | | | | | 8 | | | 12 | |
| 47 | 28 | 10 | 80 | | 10 | | | | | | | | |

TABLE 10

| Ink | Dye Composition | Dye Content | Water | PEG 200 | DEG-MBE | NMP | H-1,6 | TEA | DEA | BUT | CAP | EA | CAP-L |
|---|---|---|---|---|---|---|---|---|---|---|---|---|---|
| 48 | 1 | 2.0 | 80 | 5 | | 6 | 4 | | | | | 5 | |
| 49 | 2 | 3.0 | 90 | | 5 | 5 | | 0.2 | | | | | |
| 50 | 2 | 10.0 | 85 | 3 | | 3 | 3 | | | 5 | | 1 | |
| 51 | 4 | 2.1 | 91 | | 8 | | | | | | | | 1 |
| 52 | 5 | 3.1 | 86 | 5 | | | | | 0.2 | 4 | | | 5 |
| 53 | 6 | 1.1 | 81 | | | 9 | | 0.5 | 0.5 | | | 9 | |
| 54 | 7 | 2.5 | 60 | 4 | 15 | 3 | 3 | | | 6 | 10 | 5 | 4 |
| 55 | 8 | 5 | 65 | | 20 | | | | | 10 | | | |
| 56 | 9 | 2.4 | 75 | 5 | 4 | | 5 | | | | 6 | | 5 |
| 57 | 10 | 4.1 | 80 | 3 | 5 | 2 | 10 | | 0.3 | | | | |
| 58 | 11 | 3.2 | 65 | | 5 | 4 | 6 | | | 5 | 4 | 6 | 5 |
| 59 | 12 | 5.1 | 96 | | | | | | | | 4 | | |
| 60 | 13 | 10.8 | 90 | 5 | | | | | | 5 | | | |
| 61 | 14 | 10.0 | 80 | 2 | 6 | 2 | 5 | | | 1 | | 4 | |
| 62 | 15 | 1.8 | 80 | | 5 | | | | | | | 15 | |
| 63 | 16 | 2.6 | 84 | | | 11 | | | | | | 5 | |
| 64 | 17 | 3.3 | 80 | 2 | | | 10 | | | | 2 | | 6 |
| 65 | 18 | 12.0 | 90 | | | | 7 | 0.3 | | 3 | | | |
| 66 | 19 | 5.4 | 69 | 2 | 20 | 2 | 1 | | | | | 3 | 3 |
| 67 | 20 | 6.0 | 91 | | | 4 | | | | | | 5 | |

What is claimed is:
1. A composition comprising:

(i) a dye of Formula (1) or a salt thereof:

Formula (1)

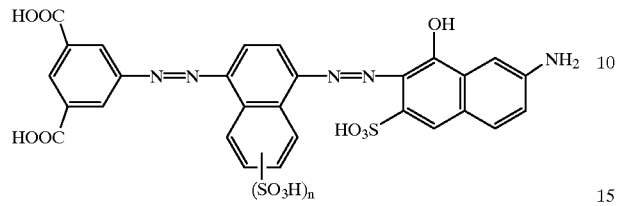

wherein n is 0 or 1; and
(ii) at least one dye selected from the group of dyes consisting of Formula (2), (3), (4), (5), (6), (7) and salts thereof:

Formula (2)

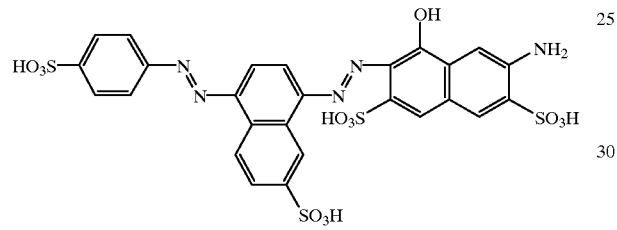

Formula (3)

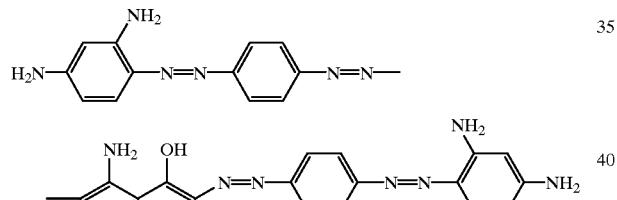

Formula (4)

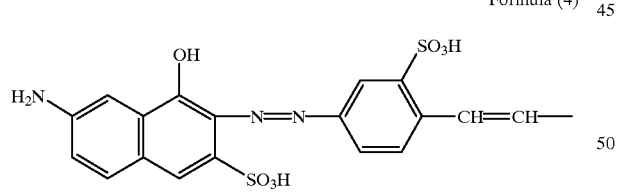

Formula (5)

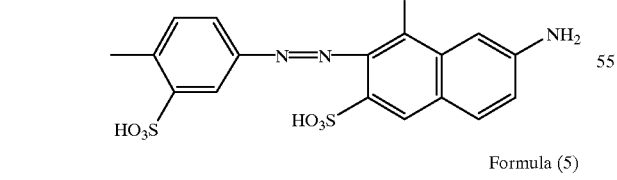

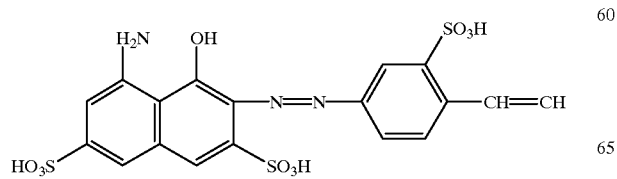

Formula (6)

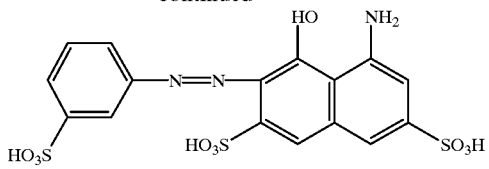

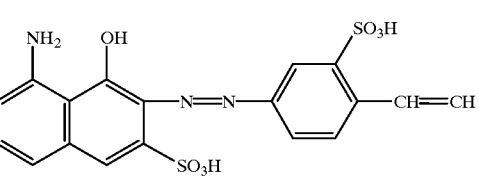

Formula (7)

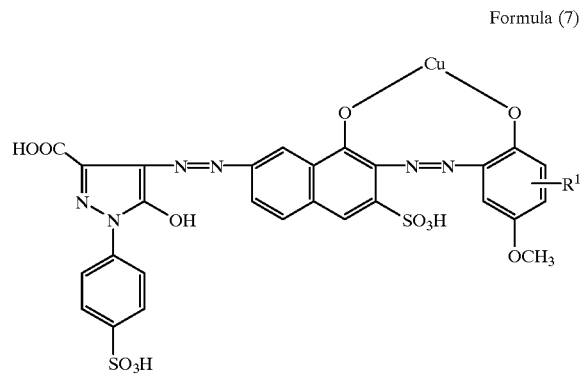

wherein:
R$^1$ is vinyl sulphonyl, hydroxyethyl sulphonyl or a group which is convertible to vinyl sulphonyl when treated with aqueous alkali.

2. A composition according to claim 1 comprising:
(a) from 99.9 to 0.1 parts of a dye of Formula (1); and
(b) from to 0.1 to 99.9 parts in total of one or more dye(s) selected from the group of dyes consisting of Formula (2), (3), (4), (5), (6) and (7);
wherein the parts are by weight and the sum of the parts (a) and (b)=100.

3. A composition according to claim 1 comprising from 90 to 10 parts of a dye of Formula (1); and from 10 to 90 parts of a dye of Formula (2);
wherein the parts are by weight and the sum of the parts of the dye of Formula (1) and the dye of Formula (2)=100.

4. A composition according to claim 1 wherein component (ii) comprises a mixture of two or more dyes selected from the of dyes consisting of the Formula (2), (3), (4), (5), (6) and (7).

5. A composition according to claim 1 wherein R$^1$ is —SO$_2$CH$_2$CH$_2$OH or —SO$_2$CH$_2$CH$_2$OSO$_3$H.

6. A composition according to claim 1 wherein n is 0.

7. A composition according to claim 1 further comprising a water-soluble yellow dye.

8. A composition comprising:
(i) from 0.1 to 50 parts of a water-soluble yellow azo dye;
(ii) from 99.9 to 0.1 parts of a dye of Formula (1); and (iii) from 0.1 to 99.9 parts in total of one or more dye(s) selected from the group of dyes consisting of Formula (2), (3), (4), (5), (6) and (7);
wherein all parts are by weight and the sum of the parts (i), (ii) and (iii)=100; and the dyes of Formula (1), (2), (3), (4), (5), (6) and (7) are as defined in claim 1.

9. A composition according to claim 8 wherein the water-soluble yellow dye is selected from the group of dyes consisting of the Formula (8), Formula (9), Formula (10), Formula (11), Formula (12) and Formula(13) and salts and tautomers thereof:

Formula (8)
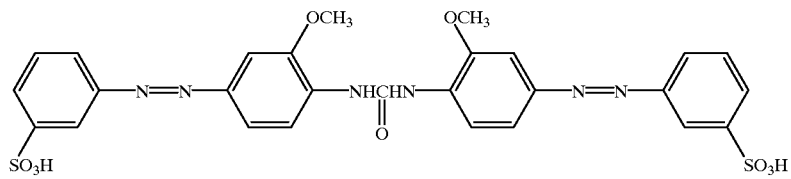

Formula (9)
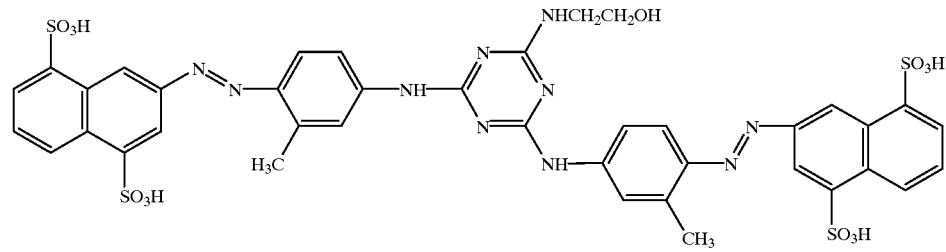

Formula (10)
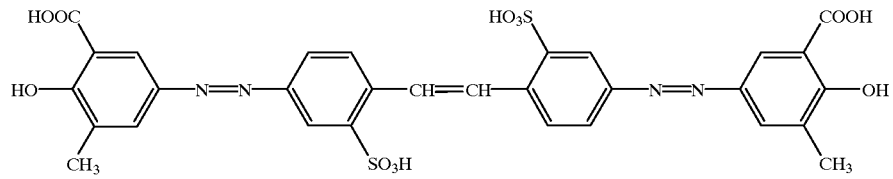

Formula (11)

Formula (12)
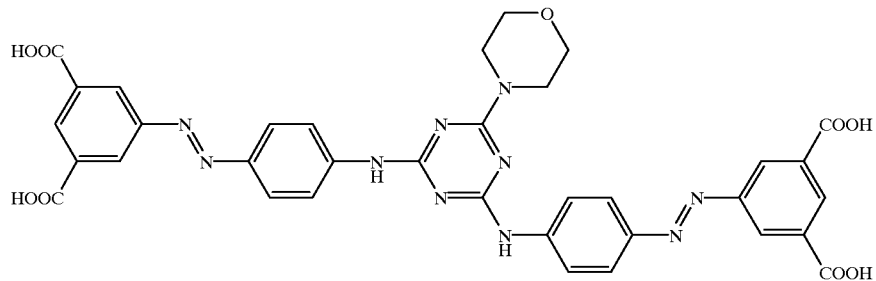

Formula (13)
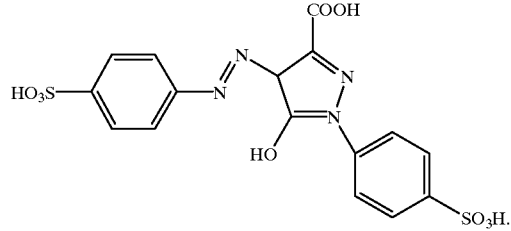

10. A composition according to claim 8 wherein component (i) is a dye of the Formula (10)

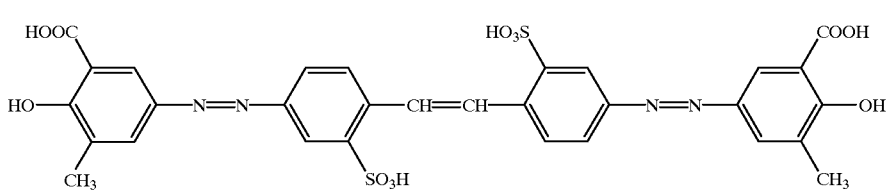

Formula 10 and component (iii) is an approximately 1:1:1 mixture of the dyes of the Formula (4), (5) and (6)

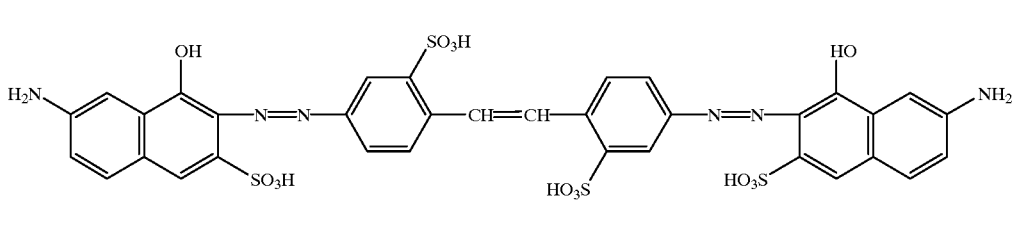

Formula (4)

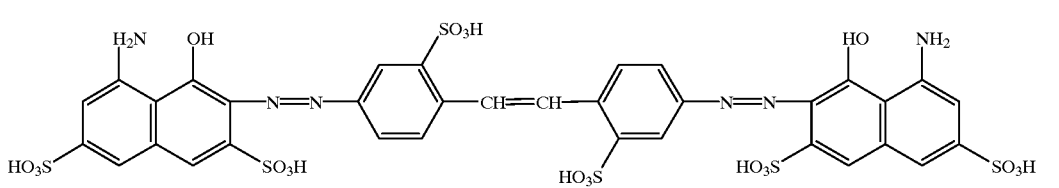

Formula (5)

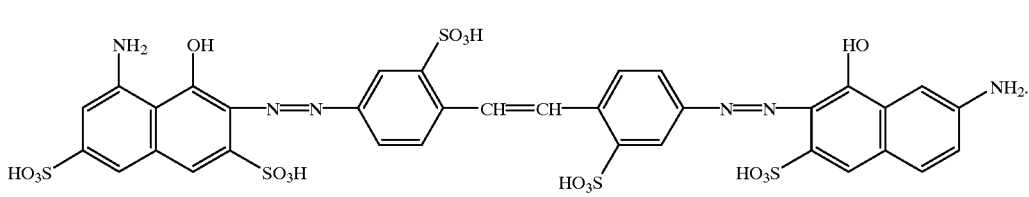

Formula (6)

11. A composition comprising
   (i) a composition according to claim 1; and
   (ii) a water soluble cyan dye.

12. A composition comprising:
   (i) from 0.1 to 30 parts of a water-soluble cyan dye;
   (ii) from 0.1 to 50 parts of a walter-soluble yellow azo dye;
   (iii) from 99.9 to 0.1 parts ot a dye of Formula (1); and
   (iv) from 0.1 to 99.9 parts in total of one or more dye(s) selected from the group of dyes consisting of Formula (2), (3), (4), (5), (6) and (7);
wherein all parts are by weight and the sum of the parts (i), (ii), (iii) and (iv)=100; and the dyes of Formula (1), (2), (3), (4), (5), (6) and (7) are as defined in claim 1.

13. A composition according to claim 11 wherein the water-soluble cyan dye is C.I. Direct Blue 199, C.I. Acid Blue 9, C.I. Direct Blue 307 or C.I. Reactive Blue 71.

14. A composition according to claim 1 or claim 8 wherein each dye independently is in the form of a salt with sodium, lithium, ammonia or a volatile amine.

15. An ink composition comprising:
   (i) a composition according to claim 1 or claim 8; and
   (ii) a liquid medium or a low melting point solid medium.

16. An ink according to claim 15 wherein the medium comprises a mixture of water and one or more water-soluble organic solvent(s).

17. An ink composition comprising:
   (a) 1 to 10 parts of a dye of Formula (1);
   (b) 1 to 10 parts in total of one or more dyes selected from the group consisting of the dye(s) of Formula (2), (3), (4), (5), (6) and (7);
   (c) 0 to 5 parts of a water-soluble yellow azo dye;
   (d) 0 to 5 parts of a water-soluble cyan dye;
   (e) 2 to 60 parts of water-soluble organic solvent(s); and
   (f) 1 to 95 parts water;
wherein all parts are by weight and the sum of the parts (a), (b), (c), (d), (e) and (f)=100 and the dyes of Formula (1), (2), (3), (4), (5), (6) and (7) are as defined in claim 1.

18. A paper an overhead projector slide or a textile material printed with an ink composition as defined in claim 15.

19. An ink jet printer cartridge containing an ink according to claim 15.

20. A process for printing a substrate with an ink composition, comprising applying to a substrate an ink composition according to claim 15 in the form of droplets.

* * * * *